No. 643,650. Patented Feb. 20, 1900.
W. F. HERDRICH & E. G. HETU.
COOKER.
(Application filed Jan. 28, 1899.)
(No Model.) 2 Sheets—Sheet 2.
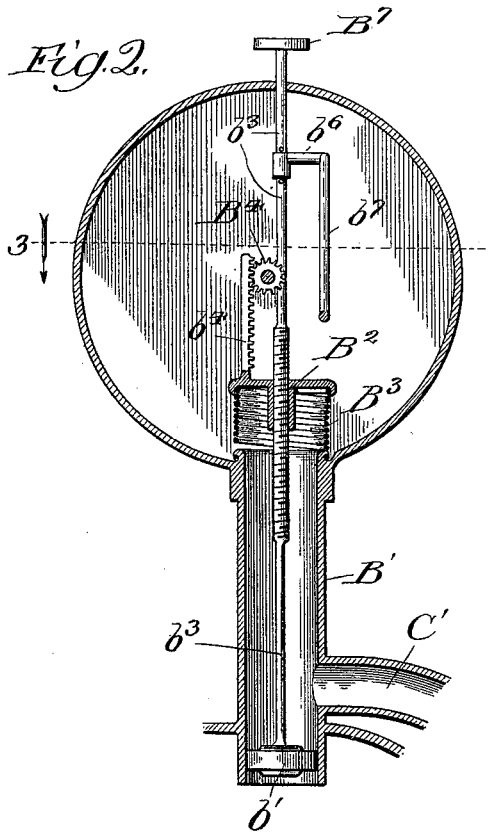
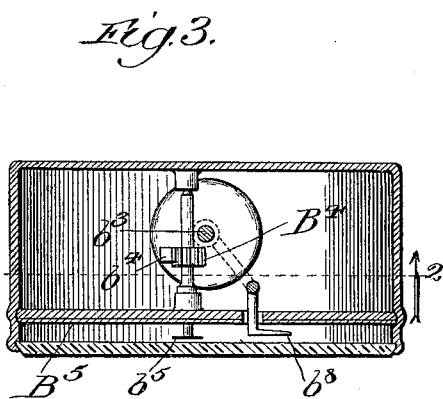
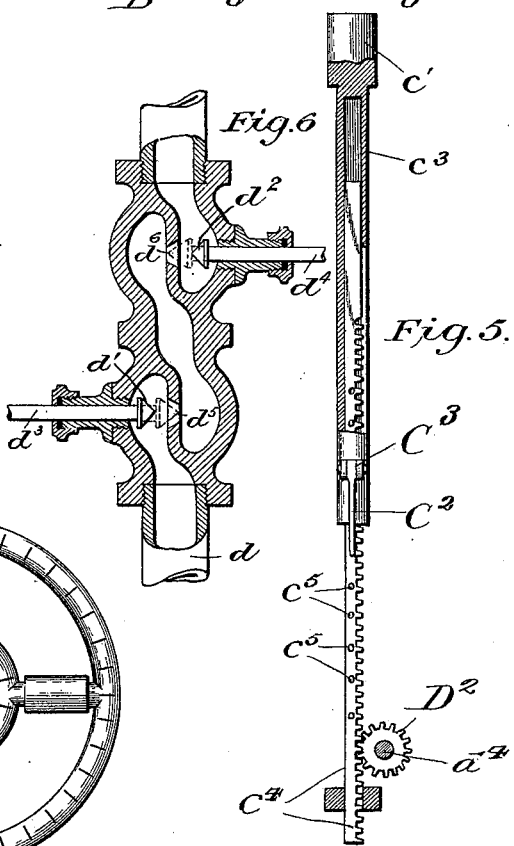
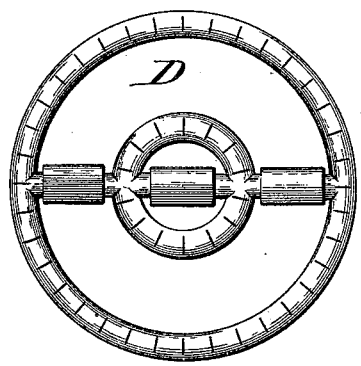
Witnesses:
Inventors:
William F. Herdrich
Elzeard G. Hetu,

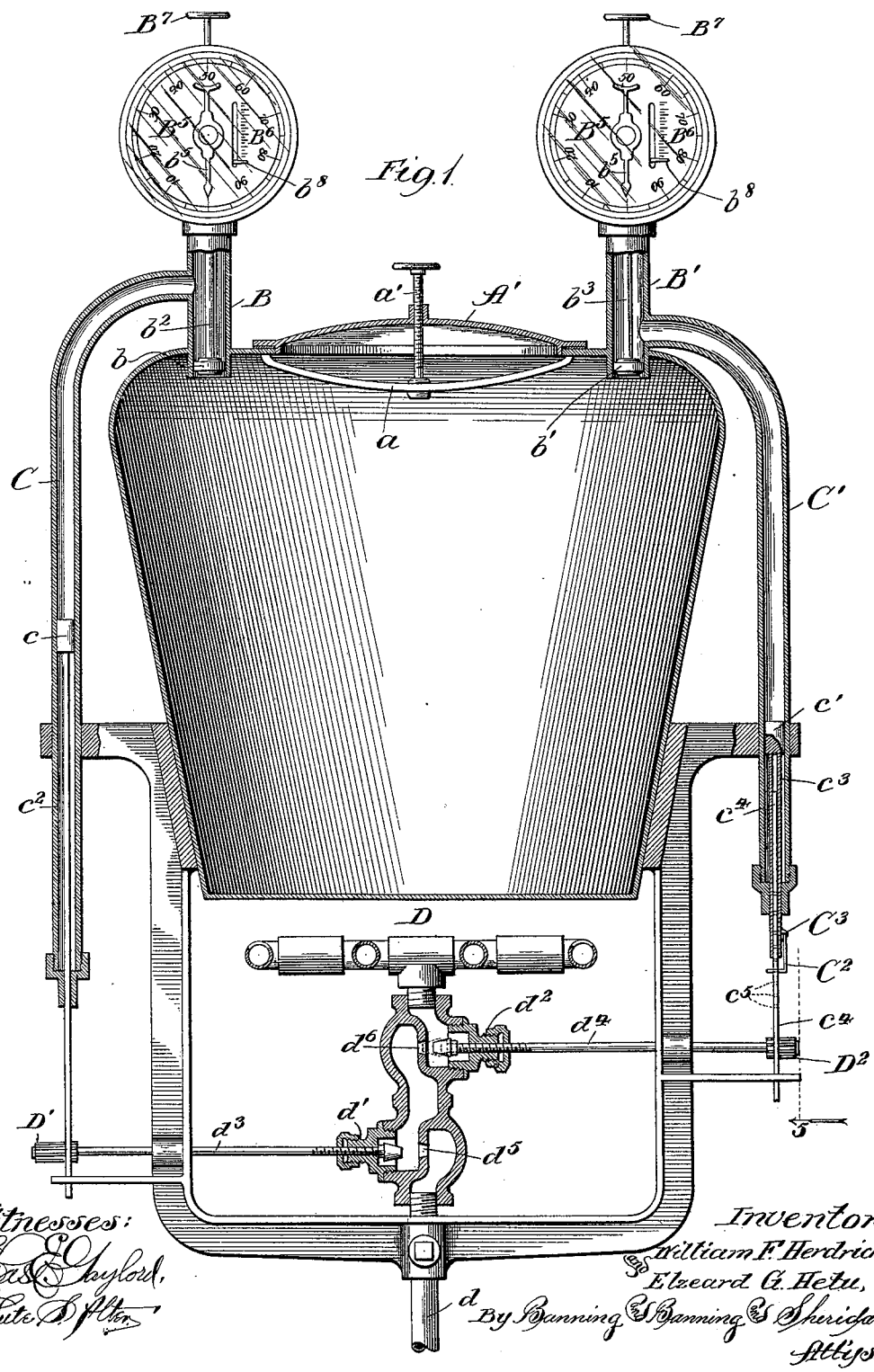

UNITED STATES PATENT OFFICE.

WILLIAM F. HERDRICH AND ELZEARD G. HETU, OF CHICAGO, ILLINOIS.

COOKER.

SPECIFICATION forming part of Letters Patent No. 643,650, dated February 20, 1900.

Application filed January 28, 1899. Serial No. 703,686. (No model.)

*To all whom it may concern:*

Be it known that we, WILLIAM F. HERDRICH and ELZEARD G. HETU, citizens of the United States, residing at Chicago, Illinois, have invented certain new and useful Improvements in Cookers, of which the following is a specification.

The object of our invention is to make a cooker more particularly for use in cooking cereals, although it may be used for cooking meats, if desired, in which means are provided for automatically diminishing or shutting off the supply of heat from time to time, as may be necessary; and our invention consists in the features and details of construction hereinafter described and claimed.

In the drawings, Figure 1 is a vertical section of our improved cooker. Fig. 2 is a sectional elevation of an indicator with the front dial-plate removed, taken in the line 2 of Fig. 3. Fig. 3 is a plan section of the indicator, taken in the line 3 of Fig. 2. Fig. 4 is a plan view of the burner. Fig. 5 is an enlarged sectional elevation of a detail, taken in the line 5 of Fig. 1; and Fig. 6 is a longitudinal section of certain valves hereinafter described, showing them in the position and relation that they occupy to the pistons, pinions, racks, and pipes shown in Fig. 1.

In making our improved cooker we take a vessel A of the desired size and material. For convenience we have shown it as a single vessel adapted to receive water and the material to be cooked, although, if desired, it may be a double vessel having an inner vessel suspended in it surrounded by water, as is commonly used for dry cooking. We are indifferent as to these particular details. The vessel is provided with an opening at its top closed by a lid A', which is provided with a spring $a$ and a screw-threaded rod $a'$, so that when the lid is applied to the cooker it may be fastened and held steam-tight by turning the screw-threaded rod $a'$. This will be readily understood from an examination of Fig. 1 and need not be further described in detail. We arrange at the top of the vessel tubes B and B', one at each side, in which are arranged pistons $b$ and $b'$, whose piston-rods $b^2$ and $b^3$ pass up into a screw-threaded cap $B^2$, under which is arranged a coiled spring $B^3$. By screwing the threaded portion of the piston-rods into the cap the position of the pistons up or down can be regulated or set at a desired point. Rising above the cap is a rack $b^4$, whose teeth engage with a pinion $B^4$, which turns an indicating-needle $b^5$, arranged on the outside of the indicator in connection with a dial-plate $B^5$, so as to indicate at a glance the amount of pressure exerted on the pistons $b$ and $b'$ and to show their positions respectively. We attach to the upper end of the rod $b^3$ an auxiliary rod $b^6$, provided with a depending arm $b^7$, which has a point $b^8$, extending out through a slot in the front plate of the indicator, opposite which is arranged a scale or gage $B^6$. By turning the handle $B^7$, extending above the top of the indicators, we can adjust the position of the piston up or down and indicate its position by means of the auxiliary gage.

Tubes C and C' lead from the piston-tubes B and B'. One of them, C, is arranged to open into the piston-tube at a higher elevation than the other, C', as will be readily understood from an inspection of Fig. 1. We arrange under the cooker a burner D, which may be an ordinary Bunsen burner or of any other desired kind adapted to be supplied with gas from a supply-pipe $d$, leading from a proper source of supply. Valves $d'$ and $d^2$ are arranged in the supply-pipe, so as to admit or shut off the supply of gas as they are turned in the one direction or the other. These valves are operated by rods $d^3$ and $d^4$, provided with pinions D' and $D^2$ at their outer ends. The pipes C and C' contain piston-heads $c$ and $c'$, whose piston-rods $c^2$ and $c^3$ extend down and out at the lower ends of the pipes. The piston-rod $c^2$ is provided with a rack engaging the teeth of the pinion D'. The piston-rod $c^3$ is made in the form of a tube, as will be seen from Figs. 1 and 5, and a rod $c^4$, provided with a rack whose teeth engage with the pinion $D^2$, extends up into it, as shown in Figs. 1 and 5. This rod $c^4$ is provided with a number of holes $c^5$, in which a hook $C^2$, pivoted at $C^3$ on the tubular piston-rod $c^3$, may be inserted, so as to adjust the rod $c^4$ up or down without disturbing the position of the piston $c'$, as may be desired.

In operating the cooker illustrated in the drawings water is placed in the vessel A, together with the particular material—cereals or meats—which it is desired to cook. The lid is inserted in place and firmly clamped to the top of the vessel by turning the screw-threaded rod $a'$ so as to bring the spring and the lid into close contact with the top of the vessel. The piston-rod $c^2$ is moved up by the hand, so that the pinion $D'$ is turned and the valve $d'$ opened, which admits a supply of gas. The rod $C^4$ is also moved up by hand, which causes the pinion $D^2$ to be rotated and the valve $d^2$ to be opened and admit a further supply of gas. When these two valves are open, the full supply of gas is on. As the water in the vessel becomes heated steam is generated and pressure applied to the pistons $b$ and $b'$, which causes them to begin to rise, which fact is shown on the dial-plates of the indicators. The force required to move the pistons $b$ and $b'$ up may be regulated by the coiled spring $B^3$, which can be set at the desired tension, which spring serves to return the pistons to their initial positions when the force of the steam is removed. When sufficient pressure has been generated in the vessel A to overcome the pressure of the spring $B^3$, the pistons $b$ and $b'$ will gradually move up until the piston $b'$ has passed the opening into the pipe $C'$, which permits the steam to pass down such pipe and exert its pressure on the piston $c'$. This moves the piston down and with it the rod $c^4$, whose teeth engage with the pinion $D^2$. This causes the pinion $D^2$ to rotate, upon which the valve $d^2$ begins to close, so as to diminish the supply of gas to the burner.

By reference to the drawings it will be seen that the valves $d'$ and $d^2$ are arranged at unequal distances from the valve-seats $d^5$ and $d^6$, the valve $d'$ being farther from its valve-seat than the valve $d^2$. The valve $d^2$ when in its in or closed position is not intended to fully close the port or opening $d^6$, as will be seen by the dotted lines in the drawings, showing such valve in its advanced position. From this construction it follows that when the piston $c'$ is moved down and the rotation continued the valve $d^2$ is entirely closed or moved to its in position, so that the supply of gas is diminished to the extent that it closes the port or opening $d^6$. If the pressure within the vessel is sufficient, the valve $b$ is moved up until it passes the opening in the pipe C, when the steam will pass down such pipe and exert its pressure on the piston $c$ and force it down, thus causing the pinion $D'$ to be rotated and the valve $d'$ to be gradually closed. If the pressure be sufficient, it will cause sufficient rotation of the pinion $D'$ to entirely close the valve $d'$ and shut off the supply of gas entirely, upon which the fire will become extinguished.

What we regard as new, and desire to secure by Letters Patent, is—

1. The combination of a vessel for containing material to be cooked, a burner for supplying heat to the vessel, a tube opening into the top of the vessel, a second tube also opening into the top of the vessel, a piston for each tube, an opening in each tube, of which one is in a higher plane than the other, controlled by the pistons, a pipe leading from each opening downward, a piston in each tube, and means actuated by said pistons for controlling the supply of gas to the burner proportioned to the pressure generated in the vessel, substantially as described.

2. The combination of a vessel for containing material to be cooked, a burner for supplying heat to the vessel, a tube opening into the top of the vessel, a second tube also opening into the top of the vessel, a piston for each tube, means for adjusting the travel of each piston, an opening in each tube, of which one is in a higher plane than the other, controlled by the pistons, a pipe leading from each opening downward, a piston for each downwardly-extending pipe, a stem or rod for each such piston, and means actuated by the stems or rods for controlling the supply of gas to the burner proportioned to the pressure generated in the vessel, substantially as described.

3. The combination of a vessel for containing material to be cooked, a tube opening into the top of the vessel, a second tube also opening into the top of the vessel, a piston for each tube, means for adjusting the position of each such piston, an opening in each tube, of which one is in a higher plane than the other, controlled by the pistons, a pipe leading from each opening downward, a piston for each downwardly-extending pipe, a stem or rod for each such piston, a burner below the cooking vessel, an upper and lower valve supplying gas to the burner, and means connecting the valves with the piston rods or stems for diminishing the supply of gas to the burner proportioned to the pressure generated in the cooking vessel, substantially as described.

4. The combination of a vessel for containing material to be cooked, a tube opening into the top of the vessel, a second tube also opening into the top of the vessel, a piston for each tube, means for adjusting the position of each piston, an opening in each tube, of which one is in a higher plane than the other, controlled by the pistons, a pipe leading from each opening downward, a piston in each pipe, a stem or rod for each such piston, a rack on one rod, a rod having a rack being vertically adjustable on the other piston stem or rod, a burner below the cooking vessel, valves admitting gas to the burner, and a pinion on each valve-stem actuated by the racks on the piston stems or rods, whereby the supply of gas is controlled by the generated pressure in the vessel, substantially as described.

5. The combination of a vessel for containing material to be cooked, two tubes leading from the top of the vessel, a piston in each tube, one piston having a longer travel in operating, means for adjusting the pistons and indicating the pressure generated in the passage, a burner supplying heat to the vessel, valves admitting a supply of gas to the burner, and means actuated by the different travel of the respective pistons in the tubes from the generated pressure in the vessel for successively operating the valve and diminishing and shutting off the supply of gas to the burner, substantially as described.

6. The combination of a vessel for containing material to be cooked, two tubes leading from the top of the vessel, an opening in each tube, the opening in one tube being located in a higher plane than in the other tube, a piston in each tube controlling the opening of its tube, a stem for each piston, a rack on each stem, a pinion engaging each rack, an indicator for each tube operated by the rack and pinion, a downwardly-leading pipe from each tube-opening, a piston in each of such pipes, a burner below the cooking vessel, valves admitting a supply of gas to the burner, and means actuated by the pistons in the downwardly-leading pipes for operating the valves and diminishing and shutting off the supply of gas to the burner, substantially as described.

7. The combination of a vessel containing material to be cooked, tubes leading from the top of the vessel, an opening in each tube, the opening in one tube being located in a higher plane than in the other tube, a piston for each tube controlling the opening of the tube, a downwardly-leading pipe from each tube-opening, a piston in each of such pipes, a stem or rod for each piston, a non-adjustable rack on one stem or rod and an adjustable rack on the other stem or rod, a burner below the cooking vessel, valves supplying gas to the burner, a stem for each valve, and a pinion on each stem engaging one with the non-adjustable rack and the other with the adjustable rack, whereby the supply of gas to the burner is controlled by the generated pressure in the cooking vessel, substantially as described.

WILLIAM F. HERDRICH.
ELZEARD G. HETU.

Witnesses:
THOMAS F. SHERIDAN,
THOMAS B. McGREGOR.